United States Patent
Oi et al.

(10) Patent No.: US 7,159,017 B2
(45) Date of Patent: *Jan. 2, 2007

(54) ROUTING MECHANISM FOR STATIC LOAD BALANCING IN A PARTITIONED COMPUTER SYSTEM WITH A FULLY CONNECTED NETWORK

(75) Inventors: Hitoshi Oi, Boca Raton, FL (US); Patrick N. Conway, Los Altos, CA (US); Takeshi Shimizu, San Jose, CA (US); Kazunori Masuyama, Kanazawa (JP); Sudheer Miryala, San Jose, CA (US); Jeremy J. Farrell, Campbell, CA (US); Norio Kaido, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 1028 days.

This patent is subject to a terminal disclaimer.

(21) Appl. No.: 10/077,144

(22) Filed: Feb. 15, 2002

(65) Prior Publication Data

US 2003/0007493 A1 Jan. 9, 2003

Related U.S. Application Data

(60) Provisional application No. 60/302,226, filed on Jun. 28, 2001.

(51) Int. Cl.
*G06F 15/177* (2006.01)
(52) U.S. Cl. .................................................. 709/220
(58) Field of Classification Search ............... 709/220
See application file for complete search history.

(56) References Cited

U.S. PATENT DOCUMENTS

| 6,536,000 | B1 * | 3/2003 | Jackson et al. ............... 714/57 |
| 6,961,761 | B1 * | 11/2005 | Masuyama et al. ......... 709/220 |
| 6,973,517 | B1 * | 12/2005 | Golden et al. ............... 710/104 |
| 2003/0002511 | A1 * | 1/2003 | Ohba et al. .................. 370/400 |
| 2004/0088523 | A1 * | 5/2004 | Kessler et al. ................ 712/29 |

\* cited by examiner

*Primary Examiner*—David Wiley
*Assistant Examiner*—J. Bret Dennison
(74) *Attorney, Agent, or Firm*—Fenwick & West LLP (57) ABSTRACT

A mechanism for balancing message traffic in a multi-chassis fully interconnected computer system partitioned into multiple domains allows the system to identify I/O transactions, to route I/O transactions over inter-domain cables, and to route non-I/O transactions over intra-domain cables. This beneficially reduces message traffic congestion on intra-domain cables.

13 Claims, 7 Drawing Sheets

| Destination Node ID | Chassis A | | Chassis B | | Chassis C | |
|---|---|---|---|---|---|---|
| | P | I/O | P | I/O | P | I/O |
| 0 | 0 | 0 | 2 | 3 | | |
| 1 | 1 | 1 | 3 | 3 | | |
| 2 | 2 | 3 | 0 | 0 | | |
| 3 | 3 | 3 | 1 | 1 | | |
| 4 | | | | | 0 | 0 |
| 5 | | | | | 1 | 1 |
| | 410a | 420a | 410b | 420b | 410c | 420c |

ROUTING MECHANISM FOR STATIC LOAD BALANCING IN A PARTITIONED COMPUTER SYSTEM WITH A FULLY CONNECTED NETWORK

RELATED APPLICATION

This application claims priority under 35 U.S.C. § 119(e) to U.S. Provisional Application No. 60/302,226 filed Jun. 28, 2001, and entitled "ROUTING MECHANISM FOR STATIC LOAD BALANCING IN A PARTITIONED COMPUTER SYSTEM WITH A FULLY CONNECTED NETWORK" by Hitoshi Oi, Patick N. Conway, Takeshi Shimizu, Kazunori Masuyama, Sudheer Miryala, Jeremy Farrell, and Norio Kaido, which is incorporated by reference herein in its entirety.

FIELD OF THE INVENTION

The present invention relates generally to the logical partitioning of a shared memory structure in a computer system, and more specifically to balancing message traffic in a partitioned computer system.

BACKGROUND OF THE INVENTION

Multi-node computer networks may be partitioned into domains, with each domain functioning as an independent machine with its own address space. An operating system runs separately in each domain. Domain partitioning permits the resources of a computer network to be efficiently allocated to different tasks, to provide flexibility in the use of a computer system, and to provide isolation between computer resources to limit the effects of hardware or software faults in one domain from interfering with the operation of other domains of the system.

In one hardware implementation of a multi-node computer network, a grouping of central processor unit (CPU) and input/output (I/O) nodes resides in a module that is sometimes called a chassis or a cabinet. Two or more chassis may be coupled together to form a multi-node cluster. When a multiple-chassis system is partitioned into several domains, a node residing in one domain is not allowed to make read and write requests to a node in another domain. As a result, cables that couple chassis in different domains (inter-domain cables) are not used for message traffic, while the cables connecting chassis in the same domain (intra-domain cables) are heavily congested with message traffic. In a partitioned system, the intra-domain message traffic is typically greater than the inter-domain message traffic.

Previous solutions for message traffic balancing are known. HP9000 "Superdome" Server of Hewlett Packard Company of Palo Alto, Calif. is among them. This system, however, does not provide support for load balancing over unused paths in a partitioned system. Another solution used for message traffic balancing is dynamic adaptive routing, which requires a complex implementation that increases hardware cost.

Therefore, there is a need for an improved mechanism to relieve message traffic congestion in a multi-node partitioned computer system.

SUMMARY OF THE INVENTION

Figure 1A:
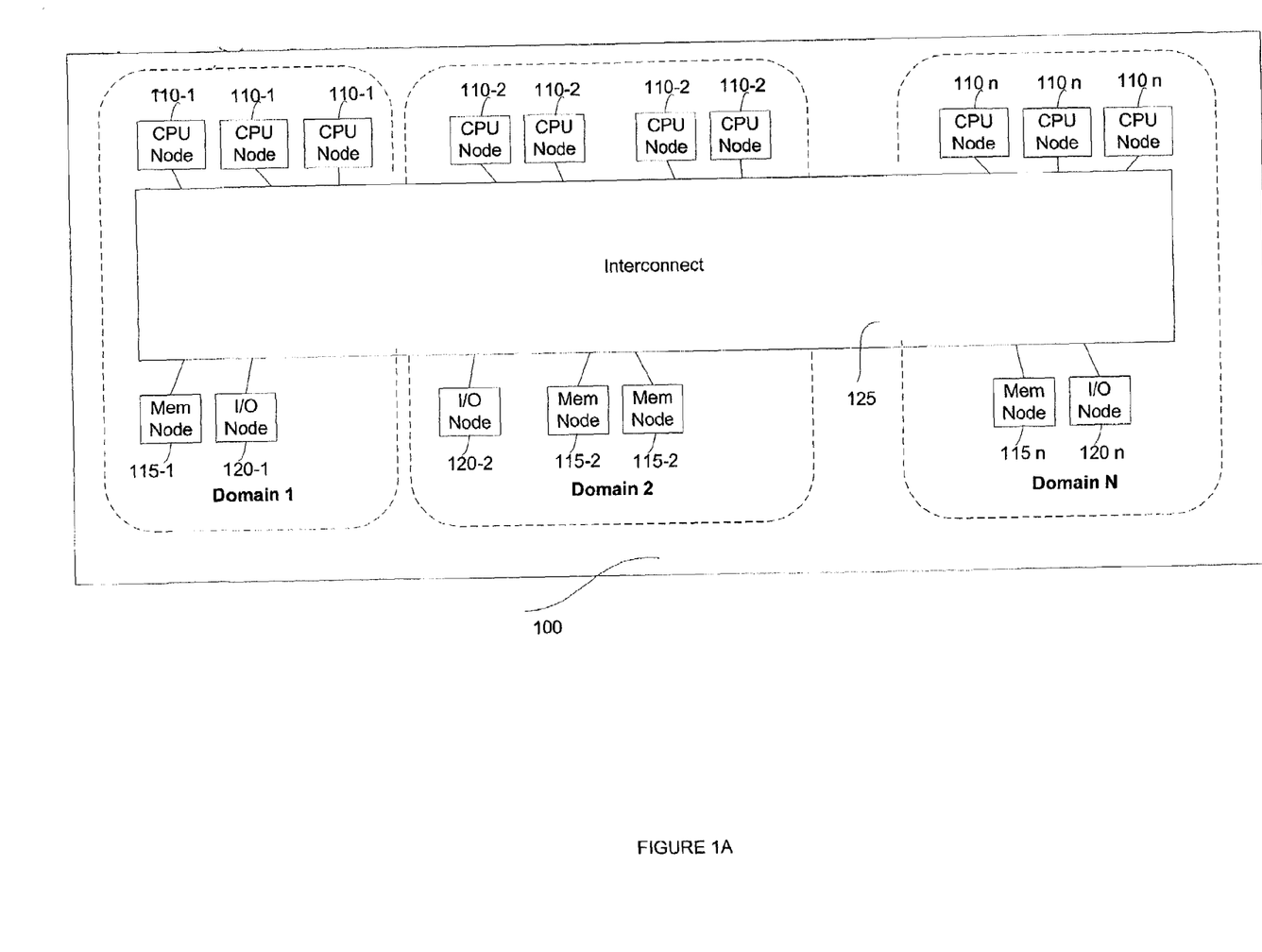
FIG. 1A is a block diagram of one embodiment of an overall architecture of a multi-node network computer system.
Figure 1B:
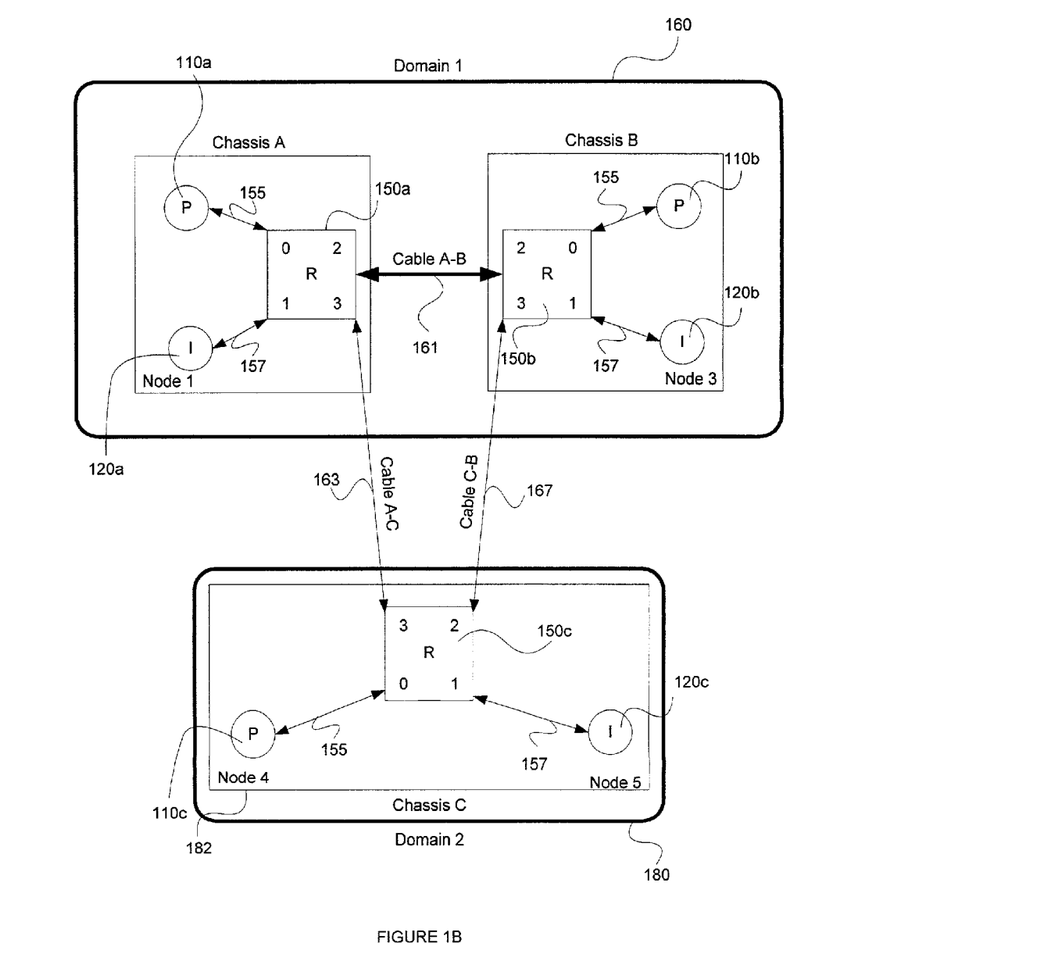
FIG. 1B is a block diagram of a fully interconnected three-chassis system partitioned into two domains in accordance with an embodiment of the present invention.
Figure 3:
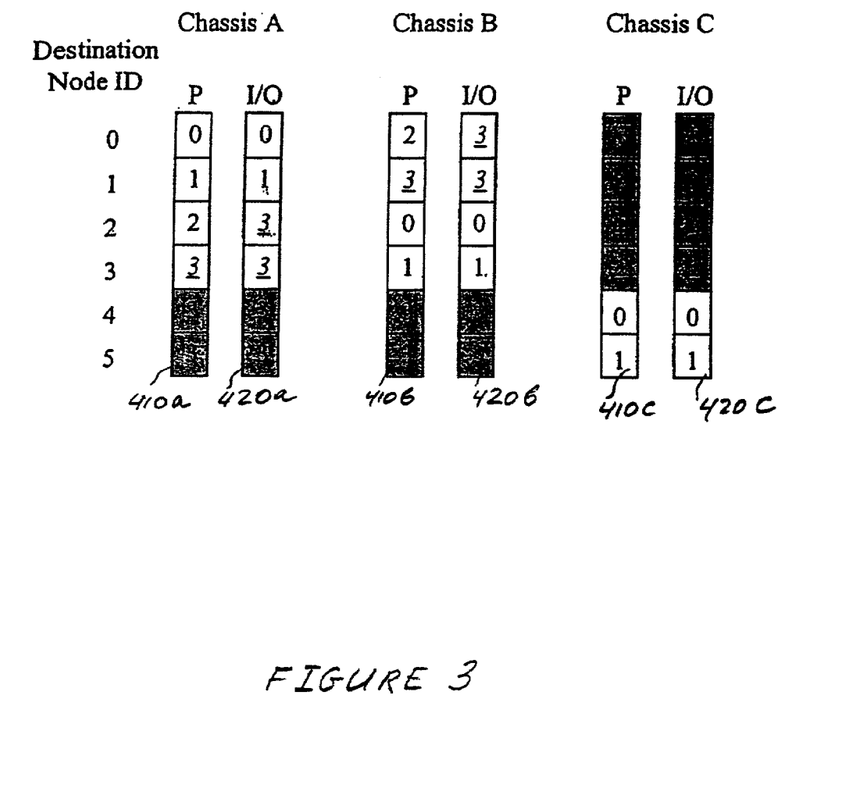
FIG. 3 is a block diagram of routing tables.

The present invention includes a system and method for balancing input/output (I/O) message traffic over inter-domain cables to reduce congestion on intra-domain cables. A multi-chassis partitioned computer system has at least two domains (as shown in FIG. 1). The domains are isolated from one another so that neither domain can directly read from or write to the shared address space of another domain. Each domain in the system has at least one chassis residing in that domain. The chassis within the same domain are coupled via an intra-domain cable. The chassis in different domains are coupled via inter-domain cables. Each chassis preferably includes a communicatively coupled processor node, an I/O node, a memory node, and a router. Each router preferably maintains at least two routing tables to determine an exit port to which a message is routed (as shown in FIG. 3). A first routing table is programmed for transactions that originate from an I/O node. A second routing table is programmed for transactions that originate from a processor node.

During each transaction, a source node requests information or resource from the destination node. A request message has the following format: a destination node field indicating ID of the destination node that receives a request message; an I/O bit field indicating a source node; and a payload field containing data. In one embodiment of the present invention, transactions are characterized as I/O transactions or processor-memory transactions (non-I/O transactions), based on a destination node ID and an I/O bit. If the destination node is an I/O node or the I/O bit indicates that a source node is an I/O node, the transaction is characterized as an I/O transaction and it is routed via inter-domain cables. Alternatively, the transaction is characterized as a processor-memory transaction (non-I/O) and it is routed via intra-domain cables. By routing I/O transactions over inter-domain cables, the present invention relieves message traffic congestion on heavily used intra-domain cables. This beneficially reduces the latency of processor-memory transactions.

DETAILED DESCRIPTION OF THE INVENTION

FIG. 1A is a block diagram of a conventional computer system 100 partitioned into a plurality of domains: Domain 1, Domain 2, and Domain N. Each domain behaves as an independent machine with its own address space. Domains 1, 2, and N are isolated from one another so that neither domain can directly read from or write to the shared address space of another domain. Each domain shown in FIG. 1A includes a plurality of nodes, such as CPU nodes 110-1 through 110-n (generally 110), memory nodes 115-1 through 115-n (generally 115), and 110 nodes 120-1 through 120-n (generally 120). Each CPU node 110 is a conventional processing unit, for example, an Intel or Intel-compatible Pentium™ class or higher processor, a Sun SPARC™ class or higher processor, or an IBM/Motorola PowerPC™ class or higher processor. Each I/O node 120 is a conventional I/O system, for example, a storage device, an input device, a peripheral device, or the like. Each memory node 115 is a conventional memory system, for example, a dynamic random access memory (DRAM) system, a static random access memory (SRAM) system, or the like. Nodes 110, 115, 120 are connected via an interconnect 125. Interconnect 125 couples two or more nodes so that instructions, data and other signals may be passed between each node. Interconnect 125 may be, for example, a mesh, a ring, or a hypercube implemented using routers or switches. In a partitioned computer system 100, read and write requests in domains 1, 2, and N can be made only between the nodes in each respective domain.

FIG. 1B is a block diagram of a fully interconnected three-chassis computer system 200 in accordance with one embodiment of the present invention. The computer system 200 is partitioned into two domains, Domain 1 160 and Domain 2 180. The domains are isolated from one another so that neither domain can directly read from or write to the shared address space of another domain. There are Chassis A and Chassis B residing in Domain 1. Chassis C resides in Domain 2. All chassis A, B, and C are fully interconnected by a conventional high data rate network cable that forms a dedicated link. For example, Chassis A and B in Domain 1 are connected via an intra-domain cable A–B 161. Chassis A and C are connected via an inter-domain cable A–C 163. Chassis B and C are connected via an inter-domain cable C–B 167.

Each chassis A, B, and C includes P nodes 110a–110c (generally 110), I/O nodes 120a–120c (generally 120), and a router 150a–150c (generally 150). Each P node 110 preferably includes a processor and memory. The embodiment shown in FIG. 1B features six nodes: three P nodes 110 and three I/O nodes (I) 120. It should be noted, however, that the partitioned system 200 may include any number of nodes.

Each router 150a–150c in each chassis A, B, and C communicatively couples with P nodes 110 in that chassis through a first set of signal lines 155 and communicatively couples with I nodes 120 in that chassis through a second set of signal lines 157. Router 150a in Chassis A couples with router 150b in Chassis B via cable A–B 161 (direct path). Router 150a in Chassis A couples with router 150c in Chassis C through cable A–C 163 (indirect path). Router 150b in Chassis B couples with router 150c in Chassis C through cable C–B 167 (indirect path). The first set of signal lines 155, the second set of signal lines 157, and cables 161, 163, and 167 may be any signal communication medium, for example one or more data wires, or the like.

Each Router 150 is a conventional 4×4 crossbar switch having a plurality of exit ports. Each Router 150 determines the next network point to which a message should be forwarded. The small numbers 0, 1, 2, 3 inside Routers 150a–150c indicate the ports to which nodes and cables are connected in the embodiment of FIG. 1B. Each Router 150 further maintains at least one routing table, an example of which is shown below in FIG. 3.

Figure 5:
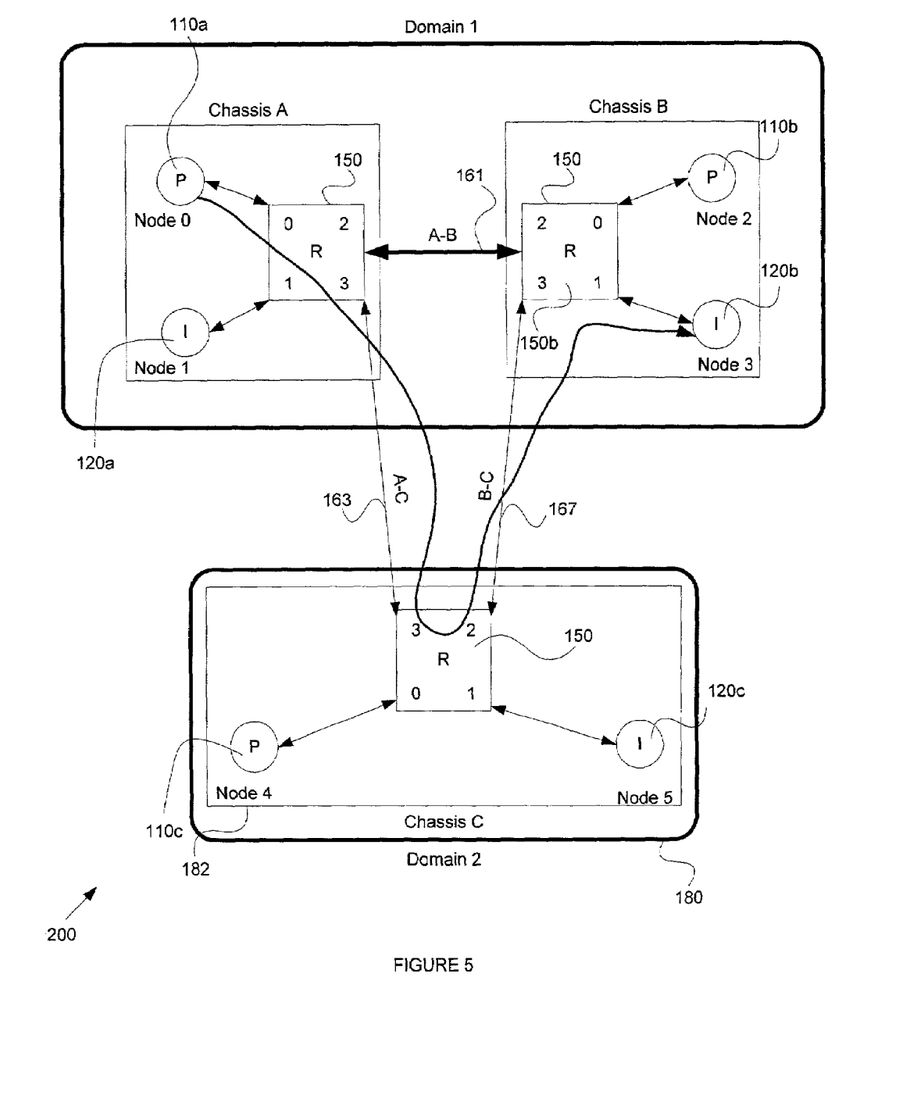
FIG. 5 is a block diagram of a processor-I/O transaction using inter-domain cables.

In accordance with the present invention there are two transaction categories: I/O transactions and processor-memory transactions (non-I/O transactions). During each transaction, a source node requests information or resource from the destination node. For simplicity, these request messages will be generally referred as messages. I/O direct memory access (DMA) transactions are initiated by the I/O node (I to P traffic). Configuration register (not shown) accesses are initiated by the processor node (P to I traffic). I/O transactions are less sensitive to memory access latency than non-I/O transactions. An example I/O transaction is described below in connection with FIG. 5. As shown in FIG. 5, P node 0 requests information from I node 3. This transaction is routed via inter-domain cables C–B 167 and A–C 163. By routing I/O transactions over the unused inter-domain cables, such as cables 163, 167, the present invention advantageously reduces traffic on intra-domain cable 161, thereby reducing latency.

In a processor-memory transaction, P node 0 in Chassis A of Domain 1 requests information from a memory of another P node 2 of Chassis B in the same domain and vice versa, as shown below in FIG. 4. This transaction is routed via intra-domain cables, such as A–B cable 161.

Figure 2:
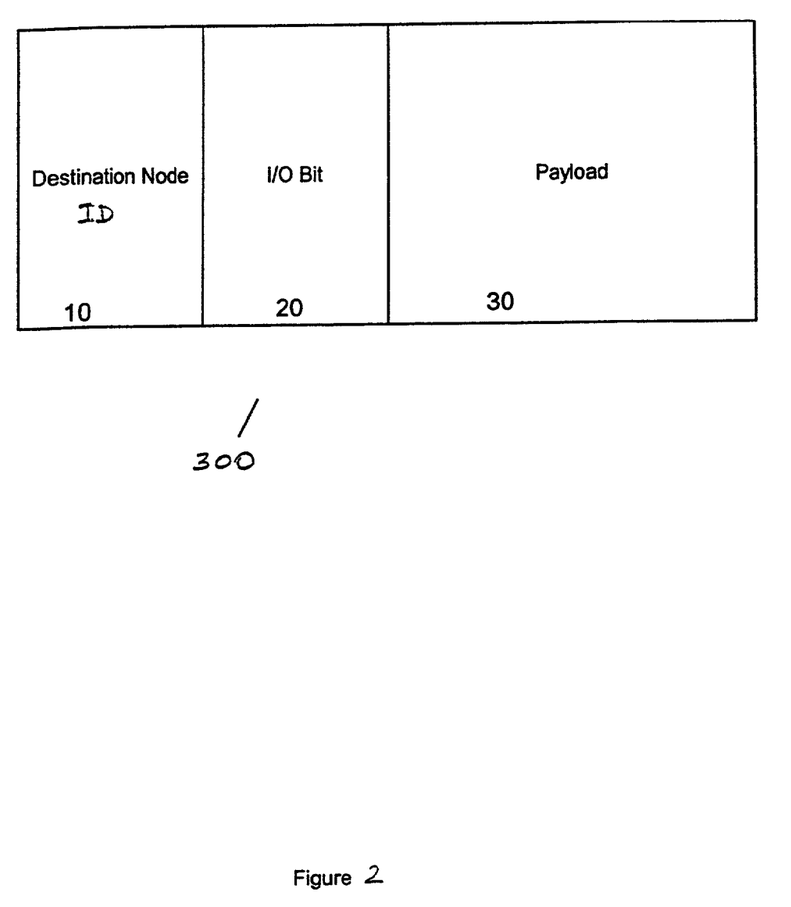
FIG. 2 pictorially illustrates a format of a request message in one embodiment of the present invention.

Referring now to FIG. 2, it pictorially illustrates a format of a request message 300 in one embodiment of the present invention. The format preferably comprises the following fields: a destination node ID field 10; an I/O bit field 20; and a payload field 30.

Each node in the system (either CPU or I/O node) has a global unique node ID. Destination node ID field 10 indicates ID of the node that receives a message, which can be either a P node 110 or an I/O node 120.

I/O bit field 20 identifies a source node (the node which originated the request message). As stated earlier, for example, a message may originate from an I/O node or P node. It is a responsibility of a source node to set the I/O bit appropriately. I/O bit field 20 preferably stores a bit value of "1" or "0". In one embodiment of the present invention, bit value "1" indicates that the source node is an I/O node and bit value of "0" indicates that the source node is a processor node. In another embodiment of the present invention, bit value "1" indicates that the source node is a processor node and bit value of "0" indicates that the source node is an I/O node. The I/O bit is used by router 150 to choose a routing table. Payload field 30 includes data itself.

FIG. 3 illustrates two routing tables of each Router 150a–150c of each Chassis A, B, and C. Routing tables 410a–410c (generally 410) are used for transactions that originate from P node 110. Routing tables 420a–420c are used for transactions that originate from an I/O node 120 in the respective chassis. Entries in routing tables 410 and 420 are indexed by the destination node ID. Each entry indicates an exit port of router 150a, 150b, 150c (e.g., port 0, 1, 2, or 3) where a message is routed. A shaded entry in routing tables 410 and 420 indicates that the destination node is outside a domain in which the message is originated. For example, as shown in FIG. 3, for Chassis A and B, destination nodes 4 and 5 are outside Domain 1 and destination nodes 0, 1, 2, and 3 are within Domain 1. For Chassis C, destination nodes 0, 1, 2, and 3 are outside Domain 2 and destination nodes 4 and 5 are in Domain 2. An entry with an underbar indicates that a message is routed through an indirect path (inter-domain cable). Examples of using routing tables 410, 420 are discussed below in connection with FIGS. 4, 5.

Figure 4:
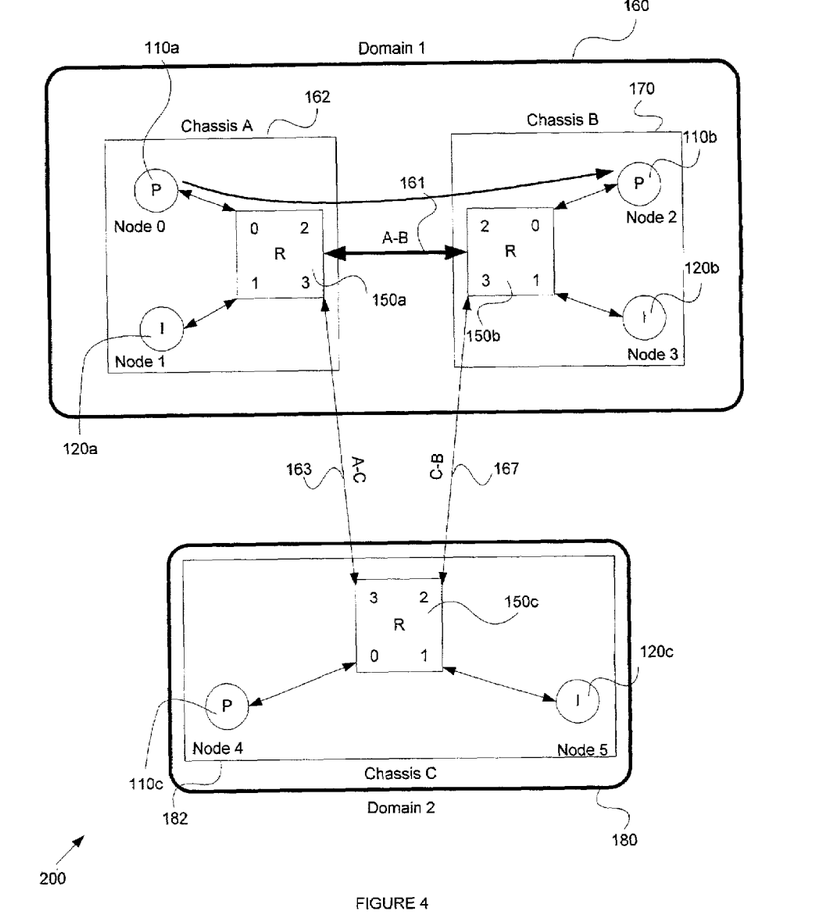
FIG. 4 is a block diagram of a processor-memory (P to P) message transaction using an intra-domain cable.

Referring now to FIG. 4, it illustrates a block diagram of a processor-memory (P to P) message transaction using intra-domain cable A–B 161. Initially, processor in node 0 of Chassis A sends a message to node 2. Router 150 identifies a source node, based on the I/O bit, and a destination node, from the message. The I/O bit=0 and it indicates that P node 0 is a source node. Destination node is Node 2. Router 150a in Chassis A uses P routing table 410*a* of FIG. 4 to determine an exit port. The entry corresponding to destination node ID 2 in routing table 410*a* indicates that the message is to be routed to port 2 of router 150*a*. The message is transmitted over cable A–B 161 and reaches at router 150*b* in Chassis B. Since this message originated from P node in Chassis A, its I/O=0. Thus, P routing table 410*b* is used to determine an exit port. P routing table 410*b* indicates that the message is to be routed to port 0 and to P node 2.

After the memory access is completed, P node 2 in Chassis B sends a response message back to P node 0 in Chassis A with I/O=0. Router 150*b* reads destination node ID and I/O bit from the response message. Router 150*b* determines that P node originated the request message. As a result, P routing table 410*b* is used. The entry corresponding to node 0 (destination of the response message) indicates that the message is to be routed to port 2 of router 150*a* via cable A–B 161. The message is transmitted over the cable A–B 161 and reaches at router 150*a* in Chassis A. I/O bit=0 and P routing table 410*a* is used. Indexing into P routing table 410*a* indicates that the message has to be routed to port 0.

Referring now to FIG. 5, it illustrates operations of the routing mechanism of the I/O transaction (P to I) using inter-domain cables C–B 167 and A–C 163. P node 0 in Chassis A accesses I node 3 of Chassis B with I/O=0. Router 150*a* receives the message and analyzes the I/O bit stored in the message. I/O bit indicates that the message originated from a P node, but not from an I/O node. Router 150*a* chooses P routing table (P) 410*a*. As shown in FIG. 3, destination node ID 3 indicates that the message is to be routed to port 3 of router 150*a* to cable A–C 163 connected to Chassis C. The message is transmitted over A–C cable 163 and reaches at router 150*c*. Since the message is not originated from an I/O node, I/O=0 and P routing table, 410*c* is used. P routing table 410*c* indicates that the message should be routed to port 2 to the cable C–B 167 connected to Chassis B. The message is transmitted over the C–B cable 167 and reaches at router 150*b*. I/O=0 and P routing table 410*b* is used. Indexing into P routing table 410*b* indicates that the message is to be routed to port 1, which is the destination of the request message (node 3).

After the I/O access is completed, I node 3 sends a response message back to P in node 0 with I/O=1. Since I/O=1, I/O routing table 420*b* is used at router 150*b*. The entry corresponding to node 0, which is a destination node ID, indicates that the message is to be routed to port 3 and then to cable C–B 167 connected to Chassis C. The message is transmitted over the cable C–B and reaches at router 150*c*. It should be noted that the I/O bit in the message is changed from 1 to 0 before the message is transmitted over cable C–B 167. Alternatively, the I/O bit can be ignored at router 150 in the non-originated chassis.

Since this message is not originated from an I/O node in the same chassis, P routing table 410*c* is used to determine an exit port. P routing table 410*c* indicates that the message is routed to Port 3 of Router 150*c* to the cable A–C 163 connected to Chassis A. The message is transmitted over the cable A–C 163 and reaches at router 150*a*. Since this message is not originated from an I/O node in the same chassis, I/O=0 and P routing table 410*a* is used. P routing table 410*a* indicates that the message is routed to port 0, which is the destination of the response message. As a result, the I/O transaction is routed over the inter-domain cables 163, 167, thereby reducing congestion on the intra-domain cable 161.

Figure 6:
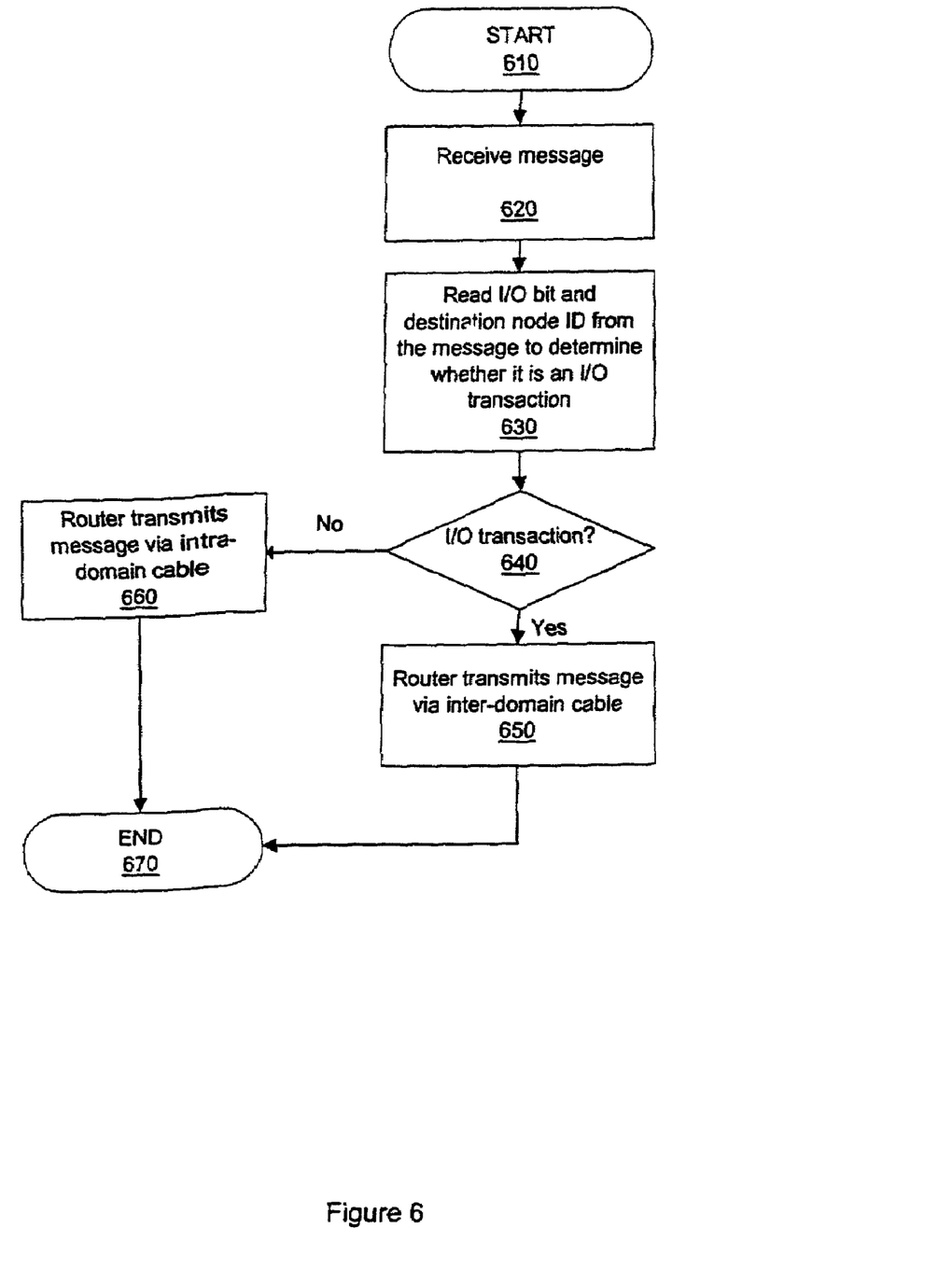
FIG. 6 is a flow chart of a method performed by the embodiment of FIG. 1B.

Referring now to FIG. 6, a flow chart of a method for balancing traffic in accordance with the present invention is shown. The process starts 610 and router 150 receives 620 a message. Router 150 identifies 630 the destination node ID, from the message. Router 150 also identifies an I/O bit indicating whether the source node is an I/O node or a processor node. If the destination node is an I/O node or the I/O bit indicates that the source node is an I/O node, this transaction is characterized 640 as an I/O transaction and it is routed 650 via inter-domain cables. Likewise, if the source node is a P node, the message is routed via inter-domain cables. Indexing into routing tables 410, 420 (shown in FIG. 3) allows the system to determine an exit port. Alternatively, if it is a non-I/O transaction (processor-memory), the message is routed 660 via an intra-domain cable and the process ends 670.

What is claimed is:

1. In a computer system partitioned into at least two domains, a first domain having at least a first and a second chassis coupled by an intra-domain cable, and a second domain having at least one chassis, each chassis of the first domain coupled to the chassis of the second domain by a first inter-domain cable and a second inter-domain cable, each chassis including a plurality of processor nodes, I/O nodes, and memory nodes, a method for balancing message traffic comprising:
   receiving a message;
   identifying, from the message, a destination node and an I/O bit having a specified value indicating whether a source node is an I/O node;
   responsive to the I/O bit indicating that the source node is an I/O node, routing the message from the first chassis to the second chassis exclusively via the first inter-domain cable and the second inter-domain cable;
   responsive to the I/O bit indicating that the source node is a non-I/O node and the destination node is a non-I/O node, routing the message from the first chassis to the second chassis via the intra-domain cable.

2. The method of claim 1, further comprising:
   responsive to the destination node being an I/O node, routing the message from the first chassis to the second chassis exclusively via the first inter-domain cable and the second inter-domain cable.

3. The method of claim 1, wherein each chassis further includes a router, the router including a routing table for identifying transactions originating from a processor node, and wherein the method further comprises:
   indexing into the routing table to determine an exit port based on the source node being the processor node.

4. The method of claim 1, wherein each chassis further includes a router, the router including a routing table for identifying transactions originating from an I/O node, and wherein the method further comprises:
   indexing into the routing table to determine an exit port based on the source node being the I/O node.

5. The method of claim 1, wherein the specified value of the I/O bit is '1 ' when the source node is an I/O node.

6. The method of claim 1, wherein the specified value of the I/O bit is '0' when the source node is a processor node.

7. The method of claim 1, wherein the specified value of the I/O bit is '1' when the source node is a processor node.

8. The method of claim 1, wherein the specified value of the I/O bit is '0' when the source node is an I/O node.

9. A multi-chassis computer system partitioned into at least two domains, a first domain having at least a first and a second chassis coupled by an intra-domain cable and a second domain having at least one chassis, each chassis of the first domain coupled to the chassis of the second domain by a first inter-domain cable and a second inter-domain cable, each chassis including a plurality of processor nodes, I/O nodes, and memory nodes, the system comprising:

means for receiving a message;

means for identifying, from the message, a destination node and an I/O bit indicating whether a source node is an I/O node;

means for routing the message from the first chassis to the second chassis exclusively via the first inter-domain cable and the second inter-domain cable, responsive to the I/O bit indicating that the source node is an I/O node; and means for routing the message from the first chassis to the second chassis via the intra-domain cable, responsive to the I/O bit indicating that the source node is a non-I/O node and the destination node is a non-I/O node.

10. The system of claim 9, further comprising:

means for routing the message from the first chassis to the second chassis via the first inter-domain cable and the second inter-domain cable, responsive to the destination node being an I/O node.

11. A multi-chassis computer system partitioned into at least two domains, the system comprising:

a first domain having at least two chassis coupled by a first cable; and a second domain having at least one chassis, each chassis of the first domain coupled to the chassis of the second domain by a first inter-domain cable and a second inter-domain cable, each chassis in the first domain and in the second domain including a router for identifying, from the message, a destination node and an I/O bit indicating whether a source node is an I/O node;

responsive to the I/O bit indicating that the source node is an I/O node or the destination node being an I/O node, routing the message from the first chassis to the second chassis exclusively via the first inter-domain cable and the second inter-domain cable; and responsive to the I/O bit indicating that the source node is a non-I/O node and the destination node is a non-I/O node, routing the message from the first chassis to the second chassis via the intra-domain cable.

12. The system of claim 11, wherein the system further comprises a plurality of I/O nodes, and wherein the router further maintains a routing table for identifying transactions originating from an I/O node.

13. The system of claim 11, wherein the system further comprises a plurality of processor nodes, and wherein the router maintains a routing table for identifying transactions originating from a processor node.

* * * * *